Patented Aug. 22, 1944

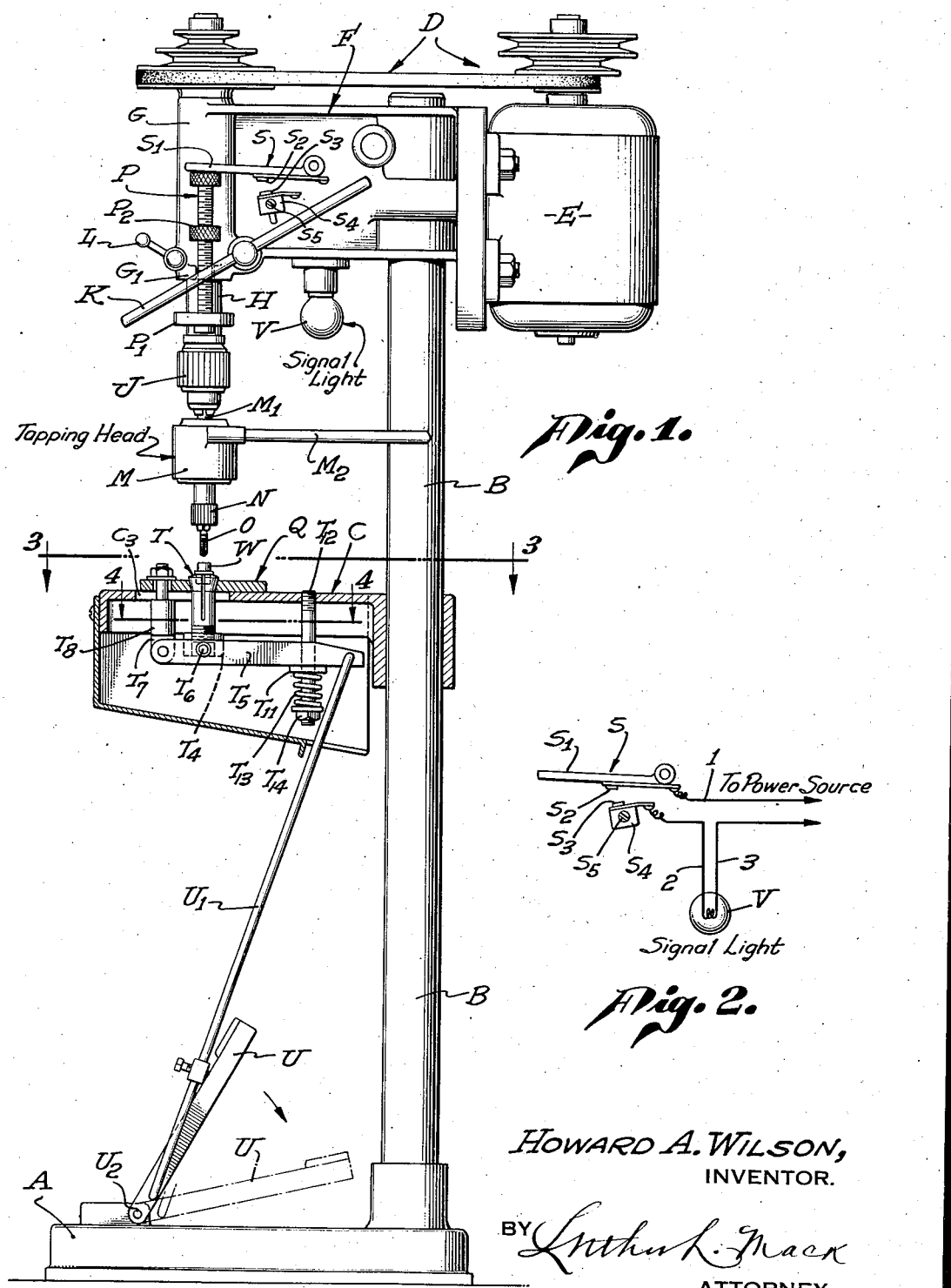

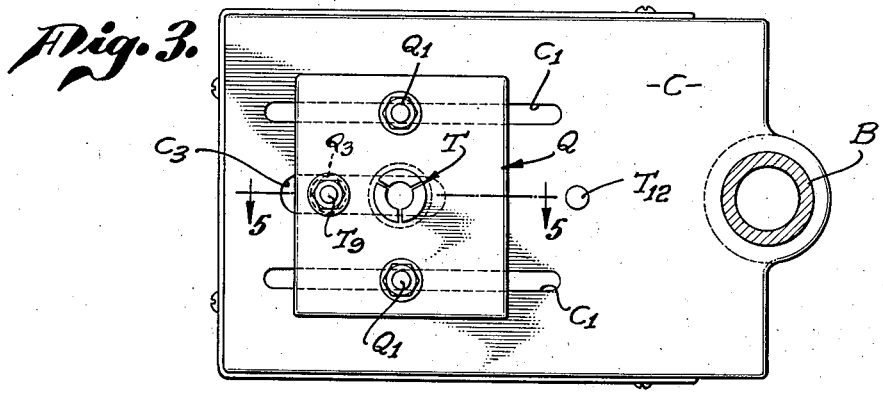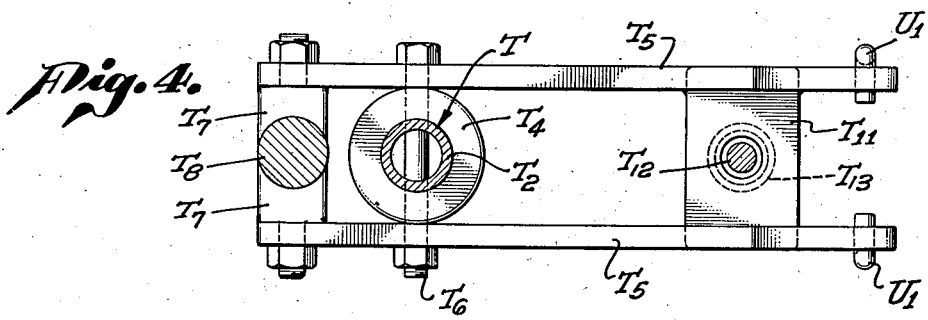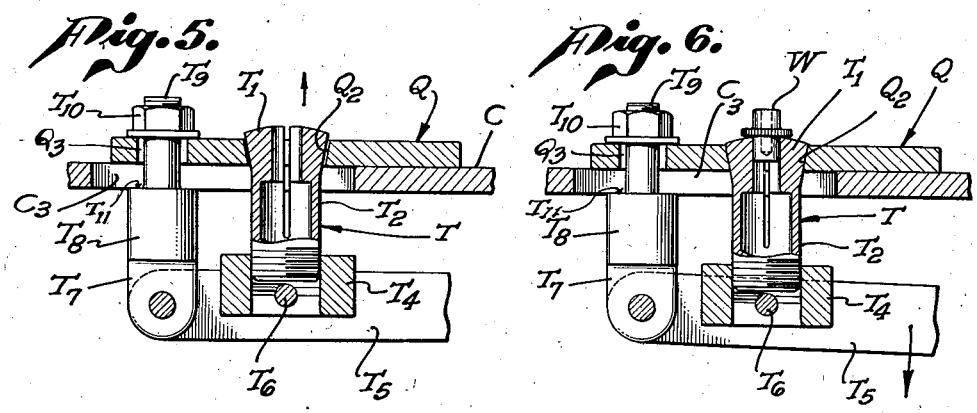

2,356,438

UNITED STATES PATENT OFFICE 2,356,438

TAPPING MACHINE

Howard A. Wilson, Los Angeles, Calif.; Lillian A. Wilson administratrix of said Howard A. Wilson, deceased Application July 16, 1943, Serial No. 495,050

8 Claims. (Cl. 10—129)

My invention relates to and has for an object the provision of a tapping mechanism which is adapted to be employed either as an independent unit or as an attachment to a drill press or other machine tool, and embodies means for adjustably supporting a piece of work on a bed or table in position for being operated upon by a suitable tapping tool, and also includes means for manually or pedally operating a suitable work holding device in alinement with a power operated tap.

An adaptation of my improvements for the purpose of this invention consists in the provision of a tapping attachment to a conventional drill press which has the usual hand operated means for raising and lowering the drill relative to work to be drilled, and, in addition, may be equipped with a mechanism embodying my invention, for supporting successive pieces of work to be tapped on the bed or table of the press when a conventional or special type of tapping head is attached to the drill stem.

More particularly, I comprehend the employment of a collet such as is usually used in lathes for holding the work to be tapped but which is vertically supported on the bed or table of a press, together with pedal operated means for constricting the collet around the work during a tapping operation.

A further object is to provide a signal means which is associated with the usual depth gauge of a drill press or other machine tool and including a switch in the circuit of a lamp, whereby when the tap attains a predetermined depth in the work, the operator will be warned so as to retract the tap from the work for another operation on a different piece of work.

In the consideration of my invention it will be understood that a tapping head of conventional or special character is attached to the drill stem of the press, and a suitable work holder is adjustably attached to the bed or table of the press, while a foot operated member is attached to the base of the drill press. As usual in drilling operations, the bed or table is rotatably mounted on a column for the purpose of adjusting the work laterally with respect to the drill, or in this case to the tap, and the work support includes a plate or holder which is adjustable longitudinally or otherwise on the bed or table. Said support carries a collet for holding the work to be tapped and a fulcrum mounting for the operating means applicable to the collet, so arranged that the fulcrum may be adjusted relative to the bed for centering the tap with respect to the work.

Other objects may appear as the description of my improvements progresses.

I have shown a preferred form of machine in the accompanying drawings, subject to modification, within the scope of the appended claims, without departing from the spirit of my invention. In said drawings:

Fig. 1 is a side elevation, partly in section, of a conventional drill press to which my improvement is applied;

Fig. 2 is a circuit diagram of a signal lamp applied to the drill press for indicating the depth limit in a tapping operation;

Fig. 3 is a sectional plan on line 3—3 of Fig. 1;

Fig. 4 is a sectional plan on line 4—4 of Fig. 1;

Fig. 5 is a fragmentary sectional elevation on line 5—5 of Fig. 3, showing the work holder open; and Fig. 6 is a similar view of the work holder as when closed and with a piece of work held therein pursuant to a tapping operation.

Briefly described, I have shown my improvements applied to a conventional type of drill press which has a base A, a vertical column B, a table or bed C adjustably mounted on said column, a transmission mechanism D connecting a motor E with a drill head F having a portion G which rotatably supports a spindle H to which is attached a clutch J for holding a drill. I provide, in addition to the usual features of such a press, a tapping head M of well known form and characteristics which is adapted to operatively support a tapping tool O relative to a piece of work W when the work is suitably supported on table C. Said tapping attachment M is provided with a clutch N for holding the tap O and is internally constructed so as to rotate the tap in one direction during a tapping operation and reversely as the tap is retracted from the work. Attachment M has a spindle $M_1$ which is held in chuck J so as to rotate the tap O corresponding to the rotation, in a single direction, of spindle H.

An arm $M_2$ extends from the housing of attachment M for engagement with the periphery of column B of the press for the purpose of preventing the rotation of said attachment during a tapping operation. As is usual in such presses, a manually operable member K is provided, as on portion G, for raising and lowering the drill head and the tapping head relative to the work, and a locking member L is also provided for holding the tapping and drilling heads in adjusted positions, such features being characteristic of drill presses. Usually spindle H carries a depth gauge P which is attached at its lower end to a portion $P_1$ and is vertically slidable in or between lugs $G_1$ on the drilling head portion G. Member P may have one or more nuts $P_2$ threaded thereon, at least one of which is engageable with the upper surface of lugs $G_1$ for limiting the downward stroke of the drilling and tapping heads.

Table C is usually formed with a pair of parallel slots $C_1$, $C_1$, extending longitudinally thereof by means of which suitable attaching bolts may be extended and positioned for holding the work thereon during a drilling operation. I provide a fixture Q which, as shown, is in the form of a plate adapted to be mounted upon the upper surface of table C and attached thereto in a desired position as by means of a pair of bolts $Q_1$, $Q_1$, said bolts extending through the slots $C_1$, $C_1$. Thus, the fixture Q may be adjusted (with the work W seated thereon) to a position axially of the tap O by the movement of the fixture longitudinally of the table C and the movement of said table rotatably about the axis of column B.

Fixture Q has a tapered aperture $Q_2$ therein adapted to receive the correspondingly tapered head $T_1$ of a collet T while the body $T_2$ depends through a slot $C_3$ of the table C and the lower end of said collet is threaded into a boss $T_4$ either formed on or attached to and between a pair of arms $T_5$, $T_5$ and securely held on said arms as by means of a bolt $T_6$, (Figs. 4 and 5). Arms $T_5$ are cross connected by means of a cross member $T_7$ having a T portion $T_8$ underlying table C and a reduced threaded portion $T_9$ extending upwardly through slot $C_3$ and also through fixture Q and held by a nut $T_{10}$. Thus, fixture Q, collet T, arms $T_5$ and their connections are simultaneously adjustable longitudinally of table C when the bolts $Q_1$ are loose, thereby changing the position of the fulcrum of arms $T_5$ with respect to the axis of tap O, without, however, affecting the operation of the collet, as will hereinafter appear.

Member Q has an aperture $Q_3$ through which the stem $T_9$ extends, said aperture being larger than said stem so as to permit an adjustment of arms $T_5$, member $T_8$ and member $T_7$ after the bolts $Q_1$ have been tightened subsequent to the approximate or actual positioning of the member Q on the bed C while the nut $T_{10}$ is loose. This arrangement is for the purpose of aligning the axis of the collet T with that of the tap O. In this connection it will be understood that due to the fact that the upper and lower ends of the collet are supported, respectively, in the plate Q and on arms $T_5$ it is necessary in a tapping operation to so support the collet which holds the work W that the axis of the collet and the work will not be even slightly inclined relative to the axis of the spindle and the tap supported thereon.

Member $T_8$ has a shoulder $T_{11}$ which engages the lower surface of bed C and when the nut $T_{10}$ is tight the alinement of the collet and the tap will be approximate, but on occasion, the position of the parts, due to various conditions, may be slightly inclined, and such conditions can be corrected with reasonable accurary by adjusting member $T_8$ relative to plate Q and thereby assuring perfect alinement of the collet and tap.

The ends of the arms $T_5$ adjacent the columns B are connected with a pedal U as by means of one or more rods $U_1$ so that when the pedal is hingedly mounted, as at $U_2$ to the base A of the press, the depression of the pedal, as shown in Fig. 1, will correspondingly depress the arms and the collet T and thereby constrict the collet for holding the work W immovably therein during a tapping operation when the tap O is lowered into position relative to the work.

It is preferable to arrange the operating mechanism with a spring return mechanism so that upon release of foot pressure on pedal U the collet T will automatically open for releasing the work held thereby and the operating mechanism will be restored to normal position preparatory to a subsequent operation. Hence, I provide a cross member $T_{11}$ suitably fixed to arms $T_5$, through which a post $T_{12}$ extends. Said post is attached at its upper end to table C and carries a compression spring $T_{13}$ beneath member $T_{11}$ and which is adapted to compress between said member $T_{11}$ and a nut $T_{14}$ on the lower end of the post, thereby urging the arms $T_5$ and collet T upwardly when pressure on pedal U is relieved.

In operation, a piece of work W is placed in the collet T and pressure applied to pedal U operates to constrict the collet and hold the work immovable during a tapping operation. The tap O is then lowered by operation of member K while being rotated in a given direction by means of its connection with spindle $M_1$. When the top reaches its limit of downward stroke, as has been predetermined the operator retracts the tap, during which movement it rotates in a reverse direction. A switch S, however, is associated with the stroke of the tap and is controlled by the gauge P. Said gauge is engaged by an arm $S_1$ connected with one terminal portion $S_2$ of the switch while the other terminal portion $S_3$ is fixed on a block $S_4$ which may be adjusted rotatably or otherwise about an axis $S_5$ for varying the distance between the two terminals of the switch to correspond to a desired movement of the tap O, depending upon the depth of a hole to be tapped.

Switch S is arranged in the circuit of a signal lamp V, as shown in Fig. 2, or otherwise, so that when the terminals $S_2$ and $S_3$ are in contact the circuit of lamp V will be closed and the operator will be afforded a signal that the tap O has been lowered to a sufficient depth in the work. Lamp V may be arranged in the electrical circuit as shown in Fig. 2 or otherwise, but as shown a wire I may lead from the terminal $S_2$ to a terminal of a line circuit connected with a source of power. Terminal $S_3$ may have, in such case, a wire 2 leading to a terminal of lamp V while the opposite terminal of the lamp may have a wire 3 leading to a source of current.

While I have illustrated and described my improvements in connection with a drill press it will be readily understood that they may be employed in connection with other types of machine tools with equally good effect, the essence of my invention comprehending the utilization of a rotatable member arranged to operatively support a tap relative to the work and manually or pedally operative means for gripping and releasing the work at the completion of each operation.

I claim:

1. A tapping machine comprising: a frame, a bed adjustable thereon, a power driven tapping head adjustable on the frame relative to the bed and including a tap, a holding base adjustable on said bed and provided with a tapered aperture, a collet reciprocable relative to the base and having a tapered head seating in said aperture, and an operating member connected with said frame, said base and said collet for gripping and holding work during tapping operations and for releasing the work at the completion of each operation by the movement of the collet head in said aperture.

2. A tapping machine as characterized in claim 1 including: a depth gauge movable with the tapping head, a signal element, and a switch controlled by said gauge for closing the circuit of said signal element when the tap has attained a predetermined point in a tapping operation.

3. A tapping machine comprising: a frame, a relatively adjustable bed and tapping head mounted on the frame, a base adjustable to fixed positions on the bed and having a tapered aperture alinable with the tap of the tapping head, a collet having a head reciprocable through said aperture for holding work during tapping operations, a support depending from the base, a lever hinged to the support and also to the collet, an operating member hinged to the frame, and means connecting the lever and the operating member, for rendering the collet operative regardless of the adjustment of the base and without adjustment of its connection with the operating member.

4. A tapping machine as characterized in claim 3 including: and means carried by the bed and associated with the lever for automatically opening the collet so as to release the work carried thereby at the end of each tapping operation.

5. A tapping machine comprising: a tapping head for operatively supporting a tap, means for moving the head into and from operative position relative to the work, and a work supporting device including a bed, a member adjustable in a given direction on and adapted to be fastened to the bed, a collet carried by said member for gripping the work to be tapped, means for contracting said collet to grip the work, and means connected with the collet and adjustable on said member universally for positively alining the axis with the axis of the tap.

6. A tapping machine comprising: a frame, a bed adjustable thereon, a power driven tapping head adjustable on the frame relative to the bed and including a tap, a holding base adjustable on said bed and provided with a tapered aperture, a collet reciprocable relative to the base and having a tapered head seating in said aperture, and an operating member connected with said frame, said base and said collet for gripping and holding work during tapping operations and for releasing the work at the completion of each operation by the movement of the collet head in said aperture, said base and said collet being commonly adjustable on said bed with said base for operatively positioning the collet relative to the tapping head.

7. A tapping machine comprising: a frame, a bed adjustable thereon, a power driven tapping head adjustable on the frame relative to the bed and including a tap, a holding base adjustable on said bed and provided with a tapered aperture, a collet reciprocable relative to the base and having a tapered head seating in said aperture, and an operating member connected with said frame, said base and said collet for gripping and holding work during tapping operations and for releasing the work at the completion of each operation by the movement of the collet head in said aperture, and means associated with said collet for normally urging the collet in the direction of the tapping head to open work receiving position.

8. A tapping machine comprising: a frame, a bed adjustable thereon, a power driven tapping head adjustable on the frame relative to the bed and including a tap, a holding base adjustable on said bed and provided with a tapered aperture, a collet reciprocable relative to the base and having a tapered head seating in said aperture, and an operating member connected with said frame, said base and said collet for gripping and holding work during tapping operations and for releasing the work at the completion of each operation by the movement of the collet head in said aperture, the connections between the operating member and the collet being arranged to move the collet on a line, coaxial with the tap.

HOWARD A. WILSON.